Nov. 29, 1966    J. L. SCHAUSTER    3,288,084
LOCOMOTIVE TRUCK
Filed Sept. 16, 1963    2 Sheets-Sheet 1

INVENTOR:
JOHN L. SCHAUSTER
BY Bedell & Burgess
ATTORNEY.

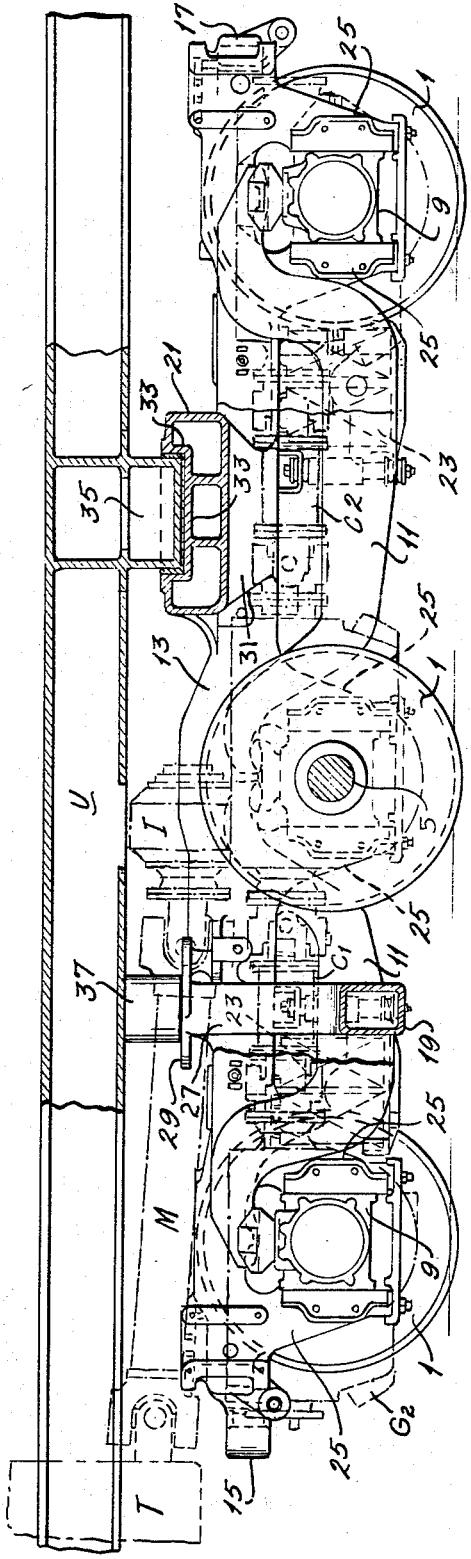

United States Patent Office 3,288,084
Patented Nov. 29, 1966

3,288,084
LOCOMOTIVE TRUCK
John L. Schauster, Highland, Ill., assignor to General Steel Industries, Inc., Granite City, Ill., a corporation of Delaware
Filed Sept. 16, 1963, Ser. No. 309,153
9 Claims. (Cl. 105—34)

The invention relates to railway rolling stock and consists particularly in a three-axle power truck for a diesel locomotive provided with a hydraulic drive.

In diesel locomotives having hydraulic drives, the conventional practice is to mount the diesel engine and transmission in the locomotive cab and have the transmission connected by a Cardan shaft to one of the axle gear boxes on the truck, from which the gear boxes on the other two axles are driven by truck mounted Cardan shafts. On six-wheel trucks it is the preferred practice to drive the middle axle gear box directly, and through it, the end axle gear boxes, and this requires that the middle axle gear box to provided with an upwardly protruding input portion for connection to the engine-driven Cardan shaft. This arrangement obviously precludes the use of a conventional centrally disposed center plate for pivotally supporting the locomotive cab or underframe on the truck. Furthermore, the provision of Cardan shafts connecting the middle axle and end axle gear boxes for transmitting driving torque therebetween requires that elements such as deep transoms, spring planks and the like usually found on six-wheel trucks between the axles be eliminated.

It is accordingly a main object of the invention to provide a three-axle truck suitable for diesel hydraulic locomotives and the like.

It is a further object to provide a three-axle truck in which the space over the middle axle is unobstructed by center plates, bolsters or other body supporting means and in which a clear passage is provided between the middle and end axles to accommodate Cardan shafts connecting the gear boxes.

It is a further object to provide a stable three point support truck for diesel hydraulic locomotives and the like having a pivot center plate disposed between the middle and one end axle and a pair of laterally spaced horizontal sliding bearings disposed between the middle axle and the other end axle.

The foregoing and additional more detailed objects and advantages of the invention will appear from the following specification and the accompanying drawings, in which:

FIG. 2 is a side elevation view of the truck illustrated in FIG. 1.

FIG. 3 is a transverse vertical sectional view along line 3—3 of FIG. 1.

FIG. 4 is a transverse vertical sectional view along line 4—4 of FIG. 1.

Figure 1:
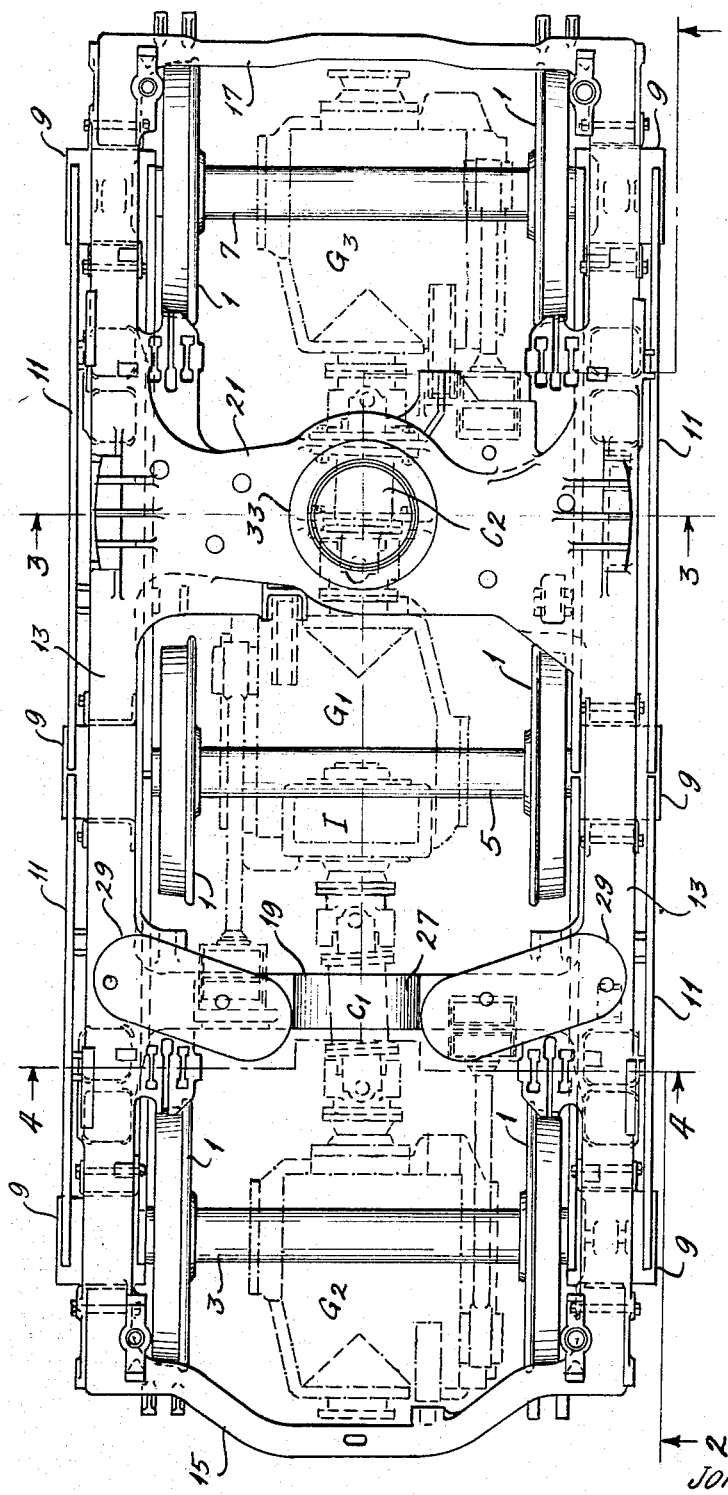
FIG. 1 is a plan view of a truck embodying the invention.

The truck comprises three wheel and axle assemblies consisting respectively of wheels 1 and axles 3, 5 and 7. Each of the axles rotatably mounts at its ends the usual journal boxes 9 and the middle axle journal box and end axle journal boxes are connected by and support the ends of drop equalizers 11. A rigid frame comprising longitudinally extending side members 13 connected at their ends by transverse transoms 15 and 17 and connected intermediate the middle and end axle assemblies by intermediate transverse transoms 19 and 21 is supported by means of coil springs 23 carried by equalizers 11 and underlyingly engaging frame side members 13. Frame side members 13 are each formed with three pairs of depending pedestal legs 25 which form downwardly open jaws vertically slidably embracing journal boxes 9 to permit relative vertical movements between the axles and the truck frame, so that vertical track irregularities can be compensated for through the equalizing system and not transmitted in full force to the truck frame, in the usual manner.

The locomotive underframe U mounts a hydraulic transmission T which is connected by means of a main Cardan drive shaft M to an upwardly projecting input portion I of gear box G mounted on middle axle 5, gear box input portion I extending upwardly well above the truck frame side members 13 in the space bounded by the side members 13 and intermediate transverse transom members 19 and 21, and shaft M overlies transoms 15 and 19 and end axle 3. The gear boxes $G_2$ and $G_3$ of end axles 3 and 7 are driven by Cardan shafts $C_1$ and $C_2$ which are positioned at a level slightly higher than the centers of the axles but below the top of the truck frame.

To accommodate main drive shaft M which must be at a relatively high level because of its connection to the body-mounted hydraulic transmission and its necessity for clearing the Cardan shaft $C_1$ connecting the middle and end axle 3 gear boxes, and to permit the positioning at a lower level of Cardan shaft $C_1$, transom 19 is depressed intermediate its ends as at 27 to provide a deep upwardly open recess extending to a level slightly below the axle centers and the end portions of transom 19 and adjacent portions of frame side members 13 are formed with flat upwardly facing bearings 29 elongated in a direction generally transverse of the truck frame, i.e., generally longitudinally of transom 19.

To permit the positioning of Cardan shaft $C_2$ between the middle axle gear box and end axle 7 gear box, the other intermediate transom 21 is arched upwardly as at 31 intermediate its intersections with frame side members 13 and it is provided at its center with an upwardly facing pivot center plate 33.

Horizontally upwardly facing bearings 29 are elongated on tangents to an arc concentric with center plate 33 and center plate 33 matingly engages a cooperating body center plate 35 on the locomotive underframe to pivotally support a portion of the body load. The locomotive underframe is also provided with depending feet 37 in slidable load-transmitting engagement with upwardly facing horizontal bearings 29 on transom 19, thereby also carrying a portion of the body load and sliding on bearings 29 to accommodate swiveling of the truck about mating center plates 33, 35.

During operation of the locomotive embodying the truck the body load will be transmitted to the truck frame through the longitudinally spaced center plate on the one hand and bearings 29 on the other hand, thereby tending to maintain the truck frame at all times parallel to the locomotive underframe, and the power transmission from the engine to the truck by means of main drive shaft M will be unimpeded because of the clearance provided for main drive shaft M transversely between the inner margins of horizontal bearings 29 and vertically by the depth of the depression at 27 in transom 19 even when the truck swivels about its center plate 33 because of the magnitude of lateral clearance provided between bearings 29, and the transmission of driving torque from the middle axle gear boxes to the end axle gear boxes by means of Cardan shafts $C_1$ and $C_2$ will similarly be unimpeded because of the construction of transoms 19 and 21, i.e., the deep depression at 27 in transom 19 and the arched configuration of transom 21.

The details of the arrangement may be modified substantially without departing from the spirit of the invention and the exclusive use of such modifications as come within the scope of the appended claims is contemplated.

What is claimed is:

1. A railway vehicle truck comprising spaced wheel and axle assemblies, a frame supported therefrom and comprising transversely spaced longitudinally extending side members and longitudinally spaced transversely extending transom members connecting said side members intermediate said assemblies, one of said transom members having its bottom surface upwardly arched intermediate its ends and being provided with an upwardly facing bearing at the center of its top surface, said other transom member mounting upwardly facing horizontal bearings spaced apart transversely of the truck and having its top surface depressed between said bearings to a level substantially lower than the crown of the arched bottom surface of said one transom member.

2. A railway vehicle truck according to claim 1, in which said first named upwardly facing bearing is a pivot center plate.

3. A railway vehicle truck according to claim 2, in which there are three of said spaced wheel and axle assemblies.

4. A railway vehicle truck according to claim 2 having gear boxes on said axles, a power input unit extending upwardly in the space defined by said side members and said transoms, and shafts connecting said power input unit and said gear boxes and extending respectively through the arch and depression in said transoms.

5. A railway vehicle truck according to claim 3 having gear boxes on said axles, the gear box on the middle axle including a power input unit extending upwardly into the space defined by said frame side members and said transoms, and shafts connecting the middle axle and end axle gear boxes and extending respectively through the arch and depressions in said transoms.

6. A railway locomotive comprising a truck according to claim 1 and an underframe having three downwardly facing bearings engaging said upwardly facing bearings of said truck, said engaged bearings forming a vertically nonyielding support for said underframe on said truck.

7. A railway locomotive according to claim 6, in which the first named upwardly facing bearing is a pivot center plate and the corresponding downwardly facing bearing on said underframe is a pivot center plate in pivotal engagement with said upwardly facing center plate.

8. A railway locomotive according to claim 7, in which the other downwardly facing bearings are in horizontally slidable engagement with said transversely spaced upwardly facing horizontal bearings.

9. A railway locomotive according to claim 7 having an engine and transmission mounted on said underframe, a power input unit carried by said truck frame and extending upwardly therefrom in the space defined by said side members and said transoms, a Cardan shaft extending from said transmission through the depression in said other transom to said power input means, gear boxes on said axles, and shafts connecting said power input unit with said gear boxes and extending respectively through the arch and depression in said transoms.

References Cited by the Examiner

UNITED STATES PATENTS

| | | | |
|---|---|---|---|
| 2,703,057 | 3/1955 | Wintemberg | 105—196 |
| 2,994,284 | 8/1961 | Travilla | 105—174 |
| 3,013,507 | 12/1961 | Stein | 105—182 |

ARTHUR L. LA POINT, *Primary Examiner.*

H. BELTRAN, *Assistant Examiner.*